Jan. 22, 1957  T. FUCHS  2,778,957
SWITCHBOARD

Filed April 15, 1954  2 Sheets-Sheet 1

Inventor,
Theodore Fuchs,
By: Schneider & Dressler,
Attys.

Jan. 22, 1957  T. FUCHS  2,778,957
SWITCHBOARD
Filed April 15, 1954  2 Sheets-Sheet 2

Inventor,
Theodore Fuchs
By: Schneider & Dressler, Attys.

United States Patent Office 2,778,957
Patented Jan. 22, 1957

2,778,957

SWITCHBOARD

Theodore Fuchs, Evanston, Ill., assignor to Isadore M. Fixman and Thomas W. Butler, doing business as Hub Electric Company, Chicago, Ill.

Application April 15, 1954, Serial No. 423,299

9 Claims. (Cl. 307—112)

This invention relates to electric panel boards and switchboards for use jointly or severally in connection with small stages and auditoriums and for similar purposes.

Power installations for flood lights, spot lights and other equipment is frequently required, particularly in schools, assembly rooms, lodge halls, churches and the like. It is essential that easy and convenient connections for such lighting be afforded without the necessity for complicated and elaborate electrical work. It is also desirable that light control equipment be connected easily and simply in such installations.

Where lighting facilities are to be provided for small stages and the like, temporary efficient dimmer control of the lights is desirable.

In accordance with this invention, there is provided a panel board which is connected between power lines and the lighting or other load to be supplied with power. In addition to the panel board, this invention provides a portable switchboard which may be operated in conjunction with and be readily connected to the panel board so that efficient control over power to load circuits may be obtained. The switchboard embodying the invention may be used independently of the new panel board as will appear later.

For a more complete understanding of the invention, reference will now be made to the drawings wherein exemplary embodiments are illustrated. It is understood, however, that variations may be made without departing from the scope of the invention except as defined by the appended claims.

Figure 1:
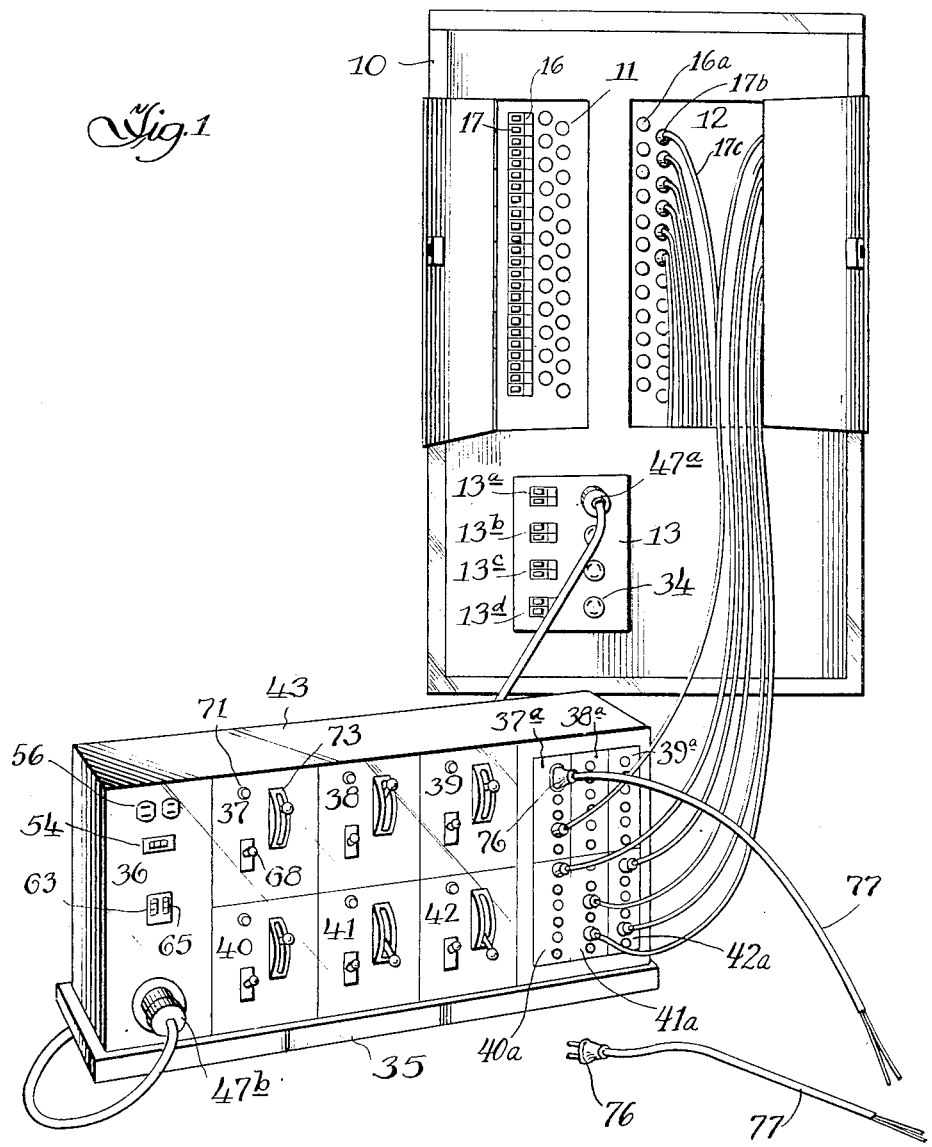
Figure 1 shows a perspective view of a panel board and temporary switchboard embodying the invention, the two being interconnected.

Referring first to Figure 1, a panel board generally indicated by numeral 10 includes a metal cabinet having compartments and doors as shown. Panel board 10 includes circuit breaker panel 11, cable hookup jack panel 12, and power connection panel 13. The entire panel is permanently mounted in the masonry or wall of a building or structure.

Figure 2:
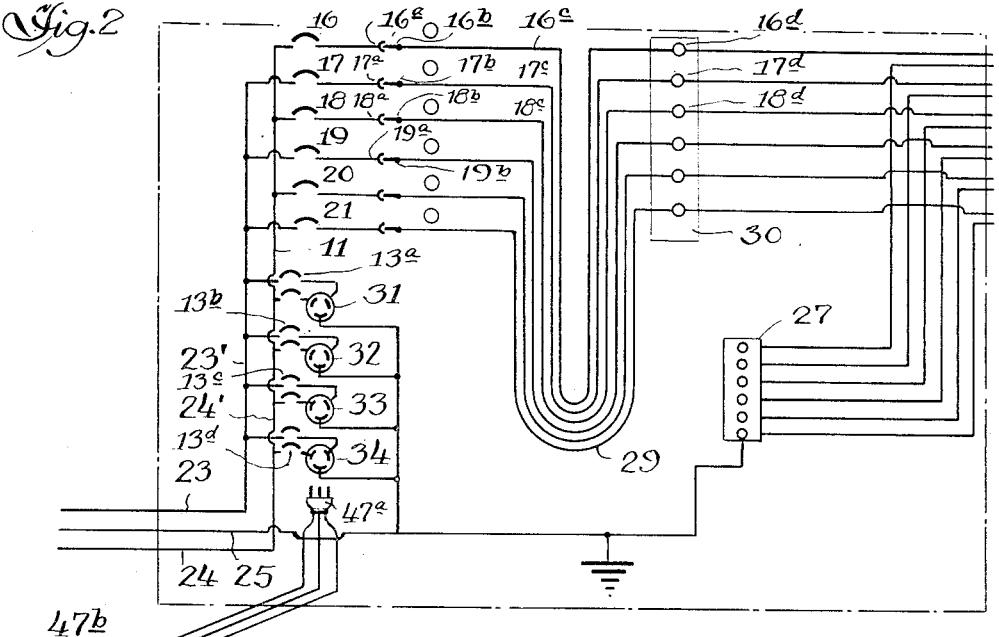
Figure 2 is a schematic showing part of the wiring in the panel board embodying the present invention.

Referring to Figure 2, the wiring diagram illustrated there will show how the various parts of the panel board assembly are interconnected. The breaker panel generally indicated by 11 may have a number of circuit breakers, of which a few are illustrated here and numbered 16 to 21 inclusive. These circuit breakers may be of any approved type for use in connection with conventional alternating current 60 cycle power lines. Instead of circuit breakers, fuses may be substituted. It is preferred, however, to use switch type circuit breakers of the type that may be manually opened or closed.

The circuit breakers are connected to either of lines 23 or 24 of a three wire line. Line 25 of the power line may be ground or neutral. Lines 23 to 25 inclusive may form a single phase 220 volt line with 110 volts between each of lines 23 and 24 on the one hand and ground wire 25 on the other hand, or may be a three-phase system, depending upon the requirements of the system. In the latter case, an additional ground wire may be provided. Lines 23, 24 and 25 will enter the cabinet by way of conduit and will be connected to heavy copper bus bars 23' and 24' and to ground.

Alternate circuit breakers are connected to one of the bus bars, as 23', and the remaining breakers are connected to the other bus bar 24'. It is, of course, possible to wire the top half of the breakers to one bus bar and wire the bottom half of the breakers to the other bus bar. It is also possible to divide the circuit breakers between the two bus bars not in accordance with the number of circuit breakers but in accordance with the power rating of the breaker. Thus, for example, it may be desirable to have the total power rating of all breakers connected to one bus bar substantially equal to the total power rating of the breakers connected to the other bus bar. With a three phase system, three bus bars would be provided and the breakers would be divided into three groups.

Ground wire 25 is connected to ground within the panel, this being to the metal of the cabinet and is also connected to ground bar 27. Ground bar 27 is usually provided with a number of terminals to which ground wires may be connected for the purpose of completing load circuits.

Referring to the breakers, each breaker is connected so that it feeds its output to a jack indicated by the same number as the breaker but carrying the subscript $a$. Thus circuit breaker 16 will be connected to jack 16a, breaker 17 will be connected to jack 17a, etc. The various jacks appear in jack panel 12. The compartment containing jack panel 12 has space within the same to accommodate a number of insulated single conductor flexible cables. Each such cable carries a plug at the free end thereof. Jack 16a is shown as having plug 16b inserted into the jack for making connection. Plug 16b is carried by cable 16c in this particular instance. It is understood, of course, that cable 16c may be disconnected by pulling its corresponding plug from jack 16a and this same cable may be inserted into any other jack. Thus the various cables 16c to 21c are not necessarily permanently preselected for the particular jacks but may be switched around as desired. Adjacent the various jacks are circuit marker discs upon which the members or descriptions of load circuits or power supply circuits may be marked.

Each of the cables 16c to 21c inclusive has enough length to hang as illustrated in the drawing and thus provide some slack for the flexible cable. The length of cable within the cabinet, indicated by loop 29, may be as long as desired such as for example 4 or 5 feet in order to endow the panel board system with sufficient flexibility for the various hookups to be later described.

Each of the flexible cables 16c to 21c inclusive has its corresponding end, 16d to 21d extending to a suitable terminal board 30 in the gutter of the cabinet. Beyond terminal board 30, the electrical connections may be conventional. Thus a line wire may be connected to one terminal of board 30, the line wire going to some socket, lamp, outlet or load as desired. A ground wire from ground terminal plate 27 will also be paired with a live wire. The various wire pairs will be in conduit or other approved covering.

Panel board 10 has power connection panel 13 provided in this particular instance with four pairs of circuit breakers 13a to 13d inclusive. Each such pair of circuit breakers is connected to two contacts of what is here illustrated as a standard 3-pole heavy duty power socket generally indicated in the case of breakers 13a by numeral 31. The third pole of the power socket is connected to a bus bar going to ground wire 25. Similarly, the remaining breaker pairs 13b, 13c and 13d are connected respectively to three-pole power sockets 32, 33 and 34. In each case, the third pole of the socket is connected to the ground wire.

Panel board 10 is primarily for power distribution purposes and ordinarily is not provided with dimmer controls. Where it is desired to have dimmer control over some or all of the load supplied by cables 16c to 21c inclusive, portable switchboard generally indicated by 35 may be provided. This portable switchboard consists of steel cabinet 43 having suitable divisions 36 to 42 inclusive and also has an output panel. Division 36 of the portable switchboard has three-pole recessed plug 45. In order to connect a portable switchboard into the panel board system, three-wire cable 46 is provided. Cable 46 is provided with conventional three-prong plug 47a and socket 47b respectively. As illustrated in Figure 1, cable 46 may be used to connect socket 31 for example in the panel board and recessed plug 45 in the portable switchboard.

Recessed plug 45 has one pole connected to neutral wire 50 while the other two poles are connected to wires 51 and 52 respectively. From wire 51, branch 53 goes to one pole of circuit breaker 54 and the circuit continues through the breaker to one terminal of pilot light 55 and one terminal of double socket 56. Pilot light 55 and socket 56 have the remaining terminals thereof connected to neutral wire 50. It will be clear from the wiring that when breaker 54 is closed, sockets 56 will be alive for 110 volts, assuming that the three-wire system is a 220-volt system. Pilot light 55 will be energized to show that these sockets are alive.

Wire 51 is connected through circuit breaker 63 to bus bar 64. Similarly, wire 52 is connected through circuit breaker 65 to bus bar 66. Bus bars 64 and 66 and neutral wire 50 extend along the length of the portable switchboard between the top row of divisions 37 to 39 inclusive and the bottom row of divisions 40 to 42 inclusive. Since each of these divisions is the same, only one need be described in detail.

Thus, for example, referring to division 37, a connection is taken from bus bar 64 going to one pole of circuit breaker 68. The other pole of the circuit breaker is connected to wire 69. From neutral wire 50, branch wire 70 is taken into division 37. Across wires 69 and 70 is connected indicating light 71 and winding 72 of any one of a number of well known dimmers. The dimmer illustrated here, for example, may be of the auto-transformer type wherein output wiper 73 is provided, this wiper being adjustable to tap off a desired voltage from the winding of dimmer 72. Output wiper 73 is connected to wire 74 going to power supply division 43.

It is understood that wire 74 is disposed within the housing for the portable switchboard. In the particular switchboard illustrated here, the six control divisions 37 to 42 inclusive are connected to individual parts of the output division. Thus, for example, division 37 has sub-division 37a of the output division 43 assigned to this particular control division. Similarly, divisions 38 to 42 inclusive have their individual sub-divisions 38a to 42a inclusive. Each cabinet division and sub-division has corresponding panel and sub-panels at the front of the cabinet.

Referring to sub-division 37a, for example, the sub-panel has, as illustrated here, six jacks 37b to 37g inclusive. The number of such jacks is merely exemplary and may be varied to suit requirements. As illustrated here, every other jack is connected to wire 74. The remaining jacks 37c, e and g are connected by a jumper to neutral wire 50. The ground jacks connected to neutral wire 50 may be marked by some distinctive color so that a person will know that these are ground return jacks. The remaining sub-divisions 38a to 42a inclusive are hooked up to their corresponding dimmer controls.

Let it be assumed that the load fed by wire 16c is to have some dimmer control. In that case, plug 16b will be pulled out of jack 16a. Cable 16c will be extended from panel board 10 to the portable switchboard and plug 16b will be inserted into, say, jack 37f. If desired, other plugs on the flexible single wire cables 16c to 21c inclusive may be pulled out of the main panel board and connected to the corresponding live side jacks 37b, 37d, and 37f.

The portable switchboard may have an enhanced field of use, with or without panel board 10. As illustrated in Figure 1, a complete two pole power connection may be made to any pair of jacks in the power output division 37a. Adjacent jacks forming a pair of live and ground jacks, as for example 37b and 37c, are so spaced as to accommodate a two-pole plug 76. Such a plug may have any suitable construction so that two spaced metal pins carried in a suitable insulating handle may be connected to or disconnected from a pair of jacks at ground and high sides respectively. The jacks and two pole plugs may be constructed so that the two are polarized whereby the pin for the high side can only engage a jack connected to the high side of the line. Plug 76 has connected thereto a two wire cable 77 which may provide power to a lamp, spot light or any temporary or other load. The output load for plug 76 is obviously independent of the output circuits from panel board 10.

The portable switchboard may be used independently of panel board 10. As long as a power connection from any source to the switchboard is made via cable 46 or other means, the switchboard may be used with one or more two-pole plugs 76 and cables 77 to furnish power to temporary loads.

Figure 3:
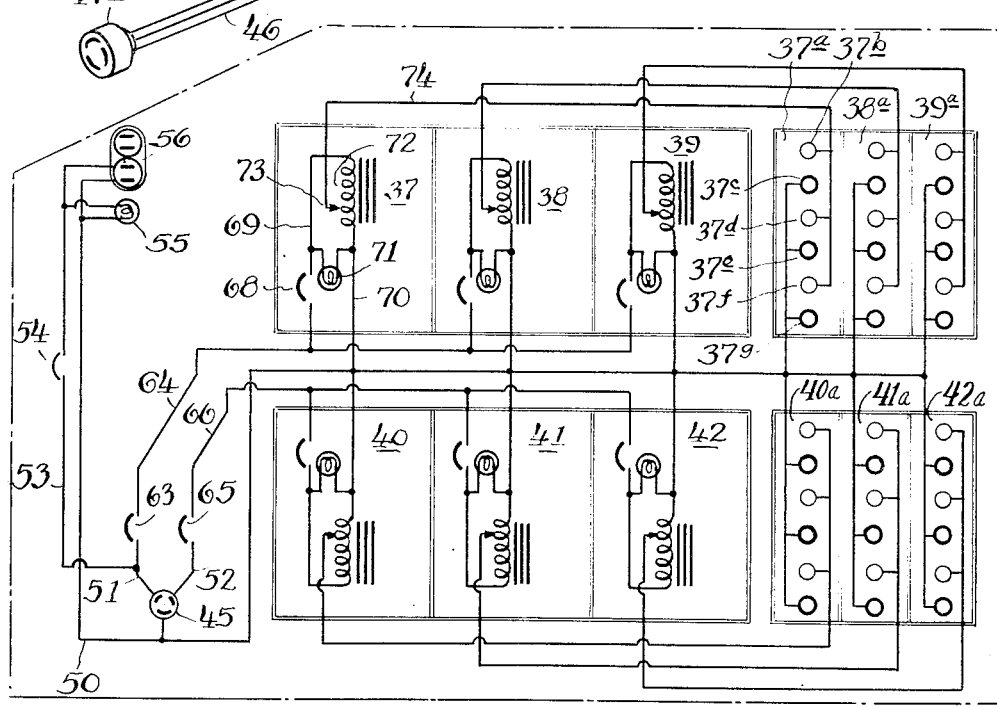
Figure 3 is a schematic showing the wiring in a portable switchboard embodying the present invention.

Additional portable switchboards may be connected to the main panel board by way of the three-pole sockets illustrated. In the portable switchboard illustrated by way of example in Figure 3, it will be clear that six individual dimmer controls are provided, each dimmer control being capable of supplying from one to three circuits connected together at the sub-divisions.

The embodiments of the invention disclosed above are particularly adaptable for schools where it is impractical to have individual dimmer switchboards for each school. Instead, a pool of portable switchboards may be maintained in a central location and loaned out to various schools as the occasion requires. The same is true for small stages in church work, fraternal work and even in such cases as athletic events and the like where occasional stage lighting effects are to be provided.

What is claimed is:

1. A panel board for use in connection with a power distribution installation, said panel board comprising a cabinet, main bus bars inside said cabinet adapted to be connected to a power line for energization, circuit breakers mounted inside the cabinet, connections between one pole of each of said circuit breakers and a bus bar, certain breakers being adapted to be connected to one bus bar and other breakers being adapted to be connected to the other bus bar, a jack for each circuit breaker and connected to the other pole thereof, said breakers being mounted in a breaker panel inside the cabinet, means for mounting said jacks in a jack panel inside the cabinet, flexible single conductor insulated cables inside the cabinet, each cable having a plug at one end thereof for cooperation with a jack, there being as many cables as there are jacks, a terminal board disposed within said cabinet, means for connecting the other end of each of said insulated cables to terminals on said terminal board, a ground plate in said cabinet, said terminal board and ground plate being adapted to be connected to load circuits, said insulated wire cables being flexible and having excess length so that said cables and jacks may be extended outside of said cabinet while still maintaining said cables connected to said terminal board.

2. A panel board according to claim 1 wherein power outlets are provided, each such power outlet consisting of a socket and connections including circuit breakers connecting the socket terminals and said bus bars whereby power connections may be made to such sockets.

3. A portable switchboard comprising a cabinet containing a number of panels, one such panel being a power input panel, a recessed plug mounted in said input panel adapted to receive a power socket, said panels including control panels and power output panels, said cabinet containing a manually adjustable light dimming means for each control panel, said control panel having the manual control for the light dimming means extending therefrom for manipulation from the front of the cabinet, said cabinet also containing a circuit breaker for each light dimming means, a circuit breaker and light dimming means being connected in series, the power output panel containing a sub-panel corresponding to each control panel, each sub-panel having at least two jacks, a connection from one terminal of said recessed plug to the free pole of the various circuit breakers, a connection from the free pole of said dimmer to a corresponding sub-panel jack, the remaining sub-panel jack having a connection to another terminal of the recessed plug, a pair of adjacent jacks in one sub-panel being adapted to provide controlled power to a load, said power being controlled through a breaker and dimmer control in a corresponding panel.

4. A portable switchboard comprising a cabinet containing a number of panels, one such panel being a power input panel, a recessed plug mounted in said input panel and adapted to receive a power socket, said panels including control panels and power output panels, said cabinet containing a manually adjustable light dimming means for each control panel, said control panel having the manual control for the light dimming means extending therefrom for manipulation from the front of the cabinet, said cabinet also containing a circuit breaker for each light dimming means, a circuit breaker and light dimming means being connected in series and the combination having two free terminals, the power output panel having a sub-panel corresponding to each control panel, each sub-panel having an even number of jacks greater than two, a connection from one terminal of said recessed plug to one free terminal of the various breaker-dimmer combinations, a connection from the remaining terminal of a breaker-dimmer combination to a corresponding sub-panel, said connection going to alternate jacks on said corresponding sub-panel, a connection between the remaining jacks in the sub-panel to the other pole of the recessed plug, a pair of adjacent jacks in one sub-panel being adapted to provide controlled power to a load, said power being controlled through a breaker and dimmer control in a corresponding panel, said sub-panel being capable of supplying as many load circuits as there are pairs of jacks.

5. The construction according to claim 4 in combination with at least one plug having two poles, said plug having the poles spaced the same distance as a pair of jacks in a sub-panel, a plug being adapted to cooperate with such a pair of jacks for providing an outside connection consisting of a live wire and ground wire to a load.

6. The construction according to claim 4 wherein said recessed plug is of the three-pole type, one pole being neutral and the remaining two poles being live, said control panels being divided into two groups, connections from one live terminal of said recessed plug to the free terminals of the circuit breakers in one group of control panels, connections between the remaining live terminal of the recessed plug to the free terminals of the breakers in the remaining group of control panels, each sub-panel having an even number of jacks with at least four jacks being provided for each sub-panel, alternate jacks in a sub-panel being connected to the output of the corresponding dimmer, the remaining jacks in a sub-panel being connected to the neutral terminal of the recessed plug, and at least one two-pole plug for cooperation with a pair of oppositely connected jacks in the sub-panels whereby a temporary load circuit may be supplied from a sub-panel.

7. In combination, a control panel board for a three-wire electric power system for use in connection with a power distribution hookup, said panel board comprising two bus bars, circuit breakers connected to said bus bars, a jack connected to each circuit breaker so that each circuit breaker is in series between a jack and a bus bar, said panel board having a circuit breaker panel having said breakers suitably mounted, said panel board also having a jack panel containing the jacks suitably mounted, said panel board containing a compartment wherein a plurality of single wire flexible insulated cables are provided, each such cable having a plug at one end for cooperation with said jacks, each such cable having the other end adapted for connection to a load or the like, said insulated cables having sufficient slack so that each plug may be removed from a jack and pulled outside of the panel, said panel board also including at least one power socket having three terminals, said socket having two terminals connected to said two bus bars, the third terminal of said socket being connected to the third wire of the system, a neutral connection in said panel for said third wire, at least one portable switchboard adapted to be associated with said panel board, said portable switchboard comprising a physically separate cabinet, means including a flexible cable for detachably connecting said three-pole socket to three wires in said portable switchboard, one of said wires being a neutral and the other two wires being bus bars for said portable switchboard, a plurality of control panels for said portable switchboard, each such control panel having a dimmer control and indicating light and circuit breaker, means connecting the circuit breaker for each panel between a bus bar and the dimmer, the other terminal of the dimmer being connected to the neutral wire, said indicating light being connected across said dimmer, an output wire from said dimmer, a power distribution panel for said switchboard, said panel having a number of sub-panels, there being one sub-panel for each control panel of said portable switchboard, at least one jack for each sub-panel, means for connecting the output wire for a dimmer control to the jack corresponding to the sub-panel for that control panel, the jacks in the sub-panels being adapted to accommodate the plugs on the flexible cables in the panel board whereby a flexible cable going to any desired load may be disconnected from the circuit breaker in the panel board and plugged into the sub-panel in the portable switchboard for the purpose of providing dimmer control in said load fed by said flexible cable.

8. The construction according to claim 7 wherein each sub-panel has a number of jacks, certain of said jacks being connected to the dimmer output whereas other jacks are connected to the neutral wire.

9. The construction according to claim 8 wherein said power input panel for the portable switchboard is provided with at least two two-wire sockets, and wherein connections including individual circuit breakers are provided for connecting each of said two wire sockets to the bus bars and neutral wire in said portable switchboard so that each two-wire socket may be connected through a breaker to a bus bar and neutral wire.

References Cited in the file of this patent

UNITED STATES PATENTS

| | | |
|---|---|---|
| 2,594,181 | Kleigl et al. | Apr. 22, 1952 |
| 2,645,725 | Miller | July 14, 1953 |
| 2,650,331 | Clark | Aug. 25, 1953 |